United States Patent
Xu

(10) Patent No.: US 12,413,549 B2
(45) Date of Patent: Sep. 9, 2025

(54) SYSTEM FOR DETECTING AND HANDLING OVERLAPPING ADDRESSES BASED ON PRIORITY

(71) Applicant: OMRON Corporation, Kyoto (JP)

(72) Inventor: Ziqiang Xu, Kusatsu (JP)

(73) Assignee: OMRON Corporation, Kyoto (JP)

( * ) Notice: Subject to any disclaimer, the term of this patent is extended or adjusted under 35 U.S.C. 154(b) by 663 days.

(21) Appl. No.: 17/604,764

(22) PCT Filed: Mar. 12, 2020

(86) PCT No.: PCT/JP2020/010719
§ 371 (c)(1),
(2) Date: Oct. 19, 2021

(87) PCT Pub. No.: WO2020/235187
PCT Pub. Date: Nov. 26, 2020

(65) Prior Publication Data
US 2022/0182355 A1  Jun. 9, 2022

(30) Foreign Application Priority Data

May 22, 2019  (JP) .................. 2019-096211

(51) Int. Cl.
*H04L 61/50* (2022.01)
*H04L 67/141* (2022.01)

(52) U.S. Cl.
CPC ............ *H04L 61/50* (2022.05); *H04L 67/141* (2013.01)

(58) Field of Classification Search
CPC ....... H04L 61/50; H04L 67/141; H04L 12/66; H04L 41/0213; H04L 45/00; H04L 45/02; H04L 45/54; H04L 45/745; H04L 61/103; H04L 61/5014; H04L 61/5092; H04L 61/58
(Continued)

(56) References Cited

U.S. PATENT DOCUMENTS 7,032,029 B1 *  4/2006  Tanzman ............. G05B 19/058
                                                   710/10
2002/0035623 A1  3/2002  Lawande et al.
(Continued)

FOREIGN PATENT DOCUMENTS

CN  101542979  9/2009
CN  105704020  6/2016
(Continued)

OTHER PUBLICATIONS

Machine Translation of JP 2016063458 to Satoyoshi et al. (Year: 2024).*

(Continued)

*Primary Examiner* — Christopher Biagini
(74) *Attorney, Agent, or Firm* — JCIPRNET

(57) ABSTRACT

A network apparatus (10), when connecting to a communication network (90), broadcasts a first address search frame that includes an address and priority of the network apparatus (10), and, upon receiving a second address search frame that is broadcast by another apparatus during connection to the communication network, returns a first return frame that includes the priority of the network apparatus (10) if there is an address overlap with the network apparatus (10).

11 Claims, 10 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 2006/0085851 | A1* | 4/2006 | Heninger | H04L 12/4641 |
| | | | | 726/15 |
| 2007/0097992 | A1* | 5/2007 | Singh | H04L 61/5007 |
| | | | | 370/395.54 |
| 2008/0195725 | A1 | 8/2008 | Ohara | |
| 2009/0006635 | A1 | 1/2009 | Siegmund | |
| 2009/0080447 | A1* | 3/2009 | Sawada | H04L 61/103 |
| | | | | 370/392 |
| 2015/0095505 | A1* | 4/2015 | Antony | H04L 61/5046 |
| | | | | 709/228 |
| 2015/0134804 | A1 | 5/2015 | Yagiu | |
| 2015/0350043 | A1* | 12/2015 | Kovács | H04L 61/103 |
| | | | | 370/245 |
| 2016/0234162 | A1* | 8/2016 | Sabet | H04L 61/5014 |

FOREIGN PATENT DOCUMENTS

| | | |
|---|---|---|
| JP | H10126429 | 5/1998 |
| JP | 2003283497 | 10/2003 |
| JP | 2004120213 | 4/2004 |
| JP | 2016063458 | 4/2016 |

OTHER PUBLICATIONS

"Office Action of Japan Counterpart Application" with English translation thereof, issued on Jan. 10, 2023, p. 1-p. 9.

"Search Report of Europe Counterpart Application", issued on May 2, 2023, pp. 1-8.

"Office Action of China Counterpart Application", issued on Jul. 5, 2022, with English translation thereof, p. 1-p. 19.

Zuoli Zhang, "DHCPv6 Network Protocol Design Under Linux," School of Computer Science and Technology of Zhejiang University, Master's Thesis in Computer System Architecture, Mar. 2003, pp. 1-63.

Thomas Schierl et al., "Scalable Video Coding Over RTP and MPEG-2 Transport Stream in Broadcast and IPTV Channels," IEEE Wireless Communications, Oct. 2009, pp. 64-71.

"International Search Report (Form PCT/ISA/210) of PCT/JP2020/010719," mailed on Jun. 16, 2020, with English translation thereof, pp. 1-4.

"Written Opinion of the International Searching Authority (Form PCT/ISA/237) of PCT/ JP2020/010719," mailed on Jun. 16, 2020, with English translation thereof, pp. 1-10.

"Office Action of Europe Counterpart Application", issued on Apr. 4, 2025, p. 1-p. 4.

* cited by examiner

SYSTEM FOR DETECTING AND HANDLING OVERLAPPING ADDRESSES BASED ON PRIORITY

CROSS-REFERENCE TO RELATED APPLICATION

This application is a 371 application of the International PCT application serial no. PCT/JP2020/010719, filed on Mar. 12, 2020, which claims the priority benefits of Japan Patent Application No. 2019-096211, filed on May 22, 2019. The entirety of each of the above-mentioned patent applications is hereby incorporated by reference herein and made a part of this specification.

BACKGROUND

Technical Field

The invention relates to a network apparatus.

Description of Related Art

In the field of factory automation (FA), control of various types of devices that share work processes is performed. In order to operate various controllers, remote I/O, and manufacturing devices used for work in a certain area such as factory facilities in cooperation with each other, an industrial network system, also called a field network, that connects these devices has been constructed. Ethernet/IP is also one of the methods for such an industrial network system (Ethernet: registered trademark).

Network apparatuses (the various devices described above) connected to the industrial network system such as Ethernet/IP need to be uniquely assigned a communication address such as an IP (Internet Protocol) address.

RELATED ART

Patent Document

[Patent Document 1] Japanese Patent Publication "Japanese Laid-Open No. 2016-63458"

SUMMARY

Problems to be Solved

When a network apparatus is newly connected to a communication network, it may be connected with an overlapped address due to a human error. If a plurality of network apparatuses have overlapped addresses, none of the network apparatuses can communicate. However, when the network apparatuses already connected with overlapped addresses are important operating facilities in control of the FA, their disconnection may cause a serious hindrance.

In addition, when the network apparatus to be newly connected is an important facility, there is also a request to preferentially connect it to enable communication.

In view of the above problems, the invention realizes a network apparatus incorporating a mechanism that can protect the connection of the network apparatus important to a user to a communication network, or can preferentially connect to the communication network for an important network apparatus.

Means for Solving the Problems

The invention adopts the following configuration in order to solve the above problems.

A network apparatus according to one aspect of the invention includes: a communication unit that performs transmission and reception of data with an other apparatus connected to a communication network; and a control unit that controls the communication unit. When the network apparatus connects to the communication network, the control unit broadcasts a first address search frame including an address of the network apparatus and a priority of the network apparatus to the communication network through the communication unit, and upon receiving a second address search frame including an address of the other apparatus and a priority of the other apparatus broadcast by the other apparatus through the communication unit during connection of the network apparatus to the communication network, the control unit compares the address of the network apparatus and the address of the other apparatus, and returns a first return frame including the priority of the network apparatus to the other apparatus through the communication unit when the address of the network apparatus and the address of the other apparatus are the same.

Effects

According to one aspect of the invention, a network apparatus can be realized, which incorporates a mechanism that can protect the connection of the network apparatus important to a user to a communication network, or can preferentially connect to the communication network for an important network apparatus.

DESCRIPTION OF THE EMBODIMENTS

Figure 1:
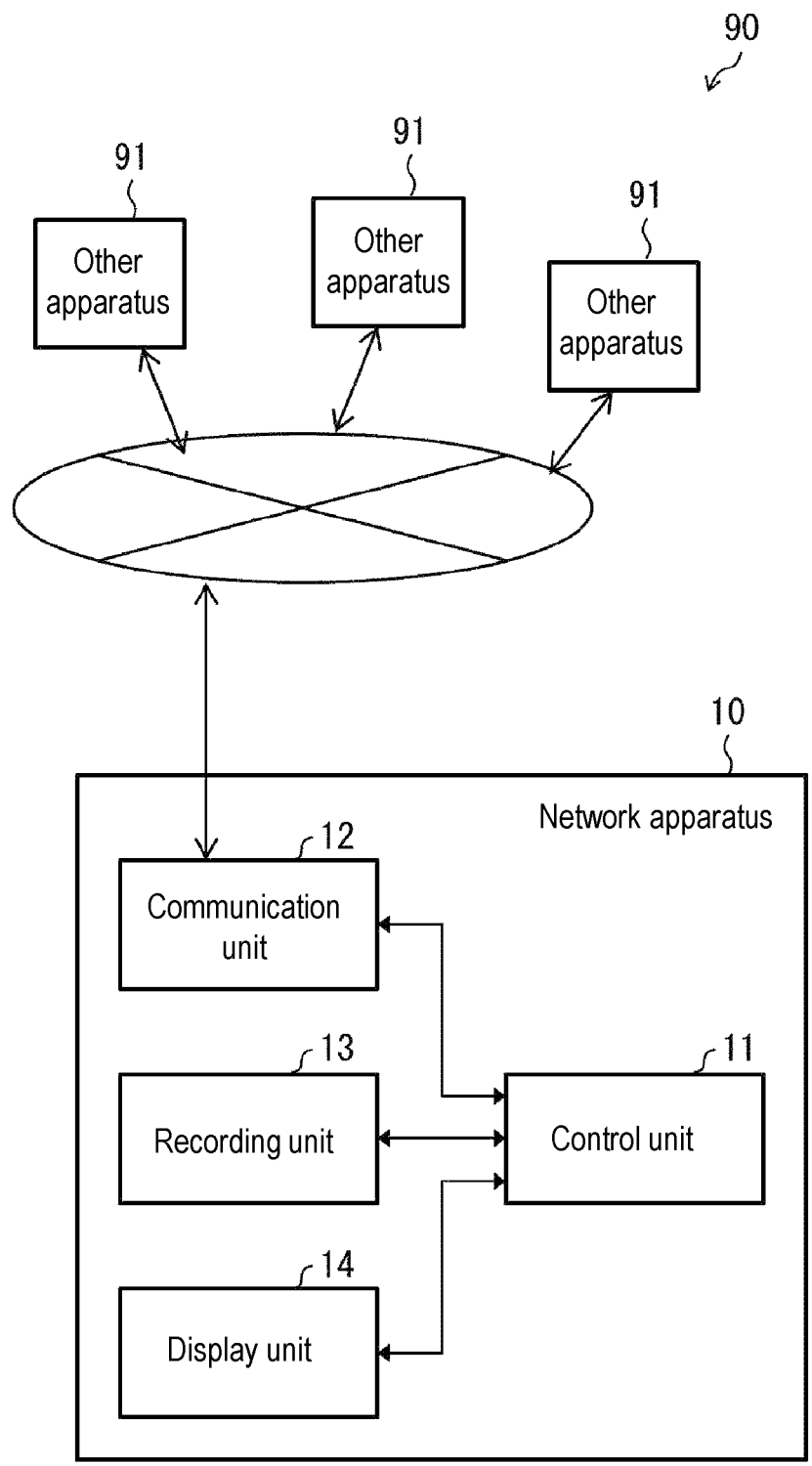
FIG. 1 is a schematic configuration diagram showing the network apparatus according to the present embodiment of the invention.

Hereinafter, an embodiment according to one aspect of the invention (hereinafter, also referred to as "the present embodiment") will be described with reference to the drawings.

1. Application Example

An example of a situation to which the invention is applied will be described hereinafter. A network apparatus of this application example includes: a communication unit that performs transmission and reception of data with an other apparatus connecting to a communication network, and a control unit that controls the communication unit.

When the network apparatus connects to the communication network, the control unit broadcasts a first address search frame that includes an address of the network apparatus and a priority of the network apparatus to the communication network through the communication unit.

Upon receiving a second address search frame that includes an address of the other apparatus and a priority of the other apparatus broadcast by the other apparatus through the communication unit during connection of the network apparatus to the communication network, the control unit compares the address of the network apparatus and the address of the other apparatus, and the control unit returns a first return frame that includes the priority of the network apparatus to the other apparatus through the communication unit when the address of the network apparatus and the address of the other apparatus are the same.

With the above configuration, when the network apparatus of this application example connects to the communication network, if the address overlaps with that of an other apparatus connected to the communication network, the following return frame can be received as a reply to the first address search frame.

If the other apparatus is an apparatus having the same function as the network apparatus, the network apparatus of this application example receives a second return frame that includes the priority of the other apparatus. The network apparatus of this application example compares the priority of the network apparatus and the priority of the other apparatus included in the second return frame, and can preferentially establish the connection to the communication network when the priority of the network apparatus is higher than the priority of the other apparatus included in the second return frame.

If the other apparatus is a conventional apparatus that does not have the function according to the invention, the network apparatus of this application example receives a third return frame that does not include the priority of the other apparatus. At this time, the network apparatus of this application example can preferentially establish the connection to the communication network.

Further, with the above configuration, during connection of the network apparatus of this application example to the communication network, if the address overlaps with that of an other apparatus newly connected to the communication network, the network apparatus can operate as follows.

If the other apparatus is an apparatus having the same function as the network apparatus, the network apparatus of this application example receives a second address search frame that includes an address and a priority of the other apparatus. The network apparatus of this application example can preferentially maintain the connection to the communication network when the priority of the network apparatus is equal to or higher than the priority of the other apparatus included in the second address search frame.

If the other apparatus is a conventional apparatus that does not have the function according to the invention, the network apparatus of this application example receives a third address search frame that includes the address of the other apparatus and does not include the priority. At this time, the network apparatus of this application example can preferentially maintain the connection to the communication network.

As described above, according to this application example, it is possible to realize a network apparatus incorporating a mechanism that can protect the connection of the network apparatus that is important to the user to the communication network, or can preferentially connect to the communication network for an important network apparatus.

2. Configuration Example

FIG. 1 is a diagram showing an example of the configuration of a network apparatus 10 according to the present embodiment. The network apparatus 10 includes a control unit 11, a communication unit 12, a recording unit 13, and a display unit 14.

The communication unit 12 is a functional block that performs transmission and reception of data with an other apparatus 91 which is another network apparatus connected to a communication network 90.

The control unit 11 is a functional block that controls the communication unit 12. The control unit 11 further performs information processing on the data acquired by the communication unit 12 and the data stored in the recording unit 13. Then, the processed data can be stored in the recording unit 13, displayed on the display unit 14, or transmitted to the other apparatus 91 through the communication unit 12.

When the network apparatus 10 itself (network apparatus 10) connects to the communication network 90, the control unit 11 broadcasts a first address search frame that includes an address of the network apparatus 10 and a priority of the network apparatus 10 to the communication network 90 through the communication unit.

Here, the connection to the communication network 90 may include physically connecting the communication unit 12 to the communication network 90 by a communication cable in a state where the power of the network apparatus 10 is on. Alternatively, the communication cable may already be connected to the operating communication network 90, but the power of the network apparatus 10 may be turned on from off. Further, it may also include a case where the power of all the network apparatuses in the communication network 90 is turned on almost at the same time.

In addition, upon receiving a second address search frame that includes an address of the other apparatus 91 and a priority of the other apparatus 91 broadcast by the other apparatus 91 through the communication unit 12 during connection of the network apparatus 10 to the communication network 90, the control unit 11 compares the address of the network apparatus 10 and the address of the other apparatus 91, and the control unit 11 returns a first return frame that includes the priority of the network apparatus 10 to the other apparatus 91 through the communication unit 12 when the address of the network apparatus 10 and the address of the other apparatus 91 are the same.

The user sets the IP address and priority in the network apparatus 10. The set IP address and priority are stored in the recording unit 13. However, the priority is not necessarily set. When the priority is not set, the network apparatus 10 behaves like a network apparatus of the existing technology that does not understand the priority.

(Configuration of Communication Frame)

Figure 2:
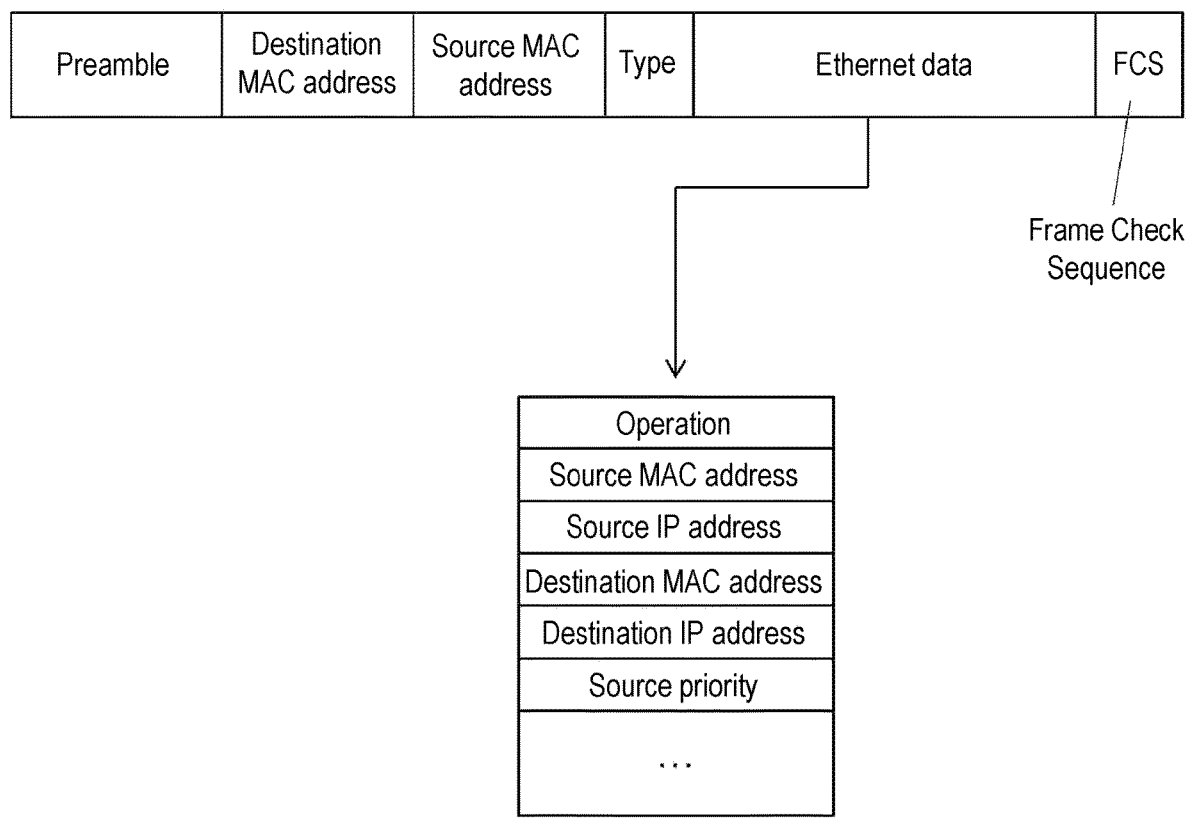
FIG. 2 is a diagram showing a configuration of the address search frame of the network apparatus according to the present embodiment of the invention.

FIG. 2 is a diagram showing a configuration of a communication frame in the present embodiment. The format of a data link layer of the communication frame conforms to the standard IEEE 802.3. The communication frame includes a destination MAC address (Media Access Control address), a source MAC address, and Ethernet data (Ethernet: registered trademark). Here, the MAC address refers to an apparatus-specific physical address assigned to each network apparatus.

As shown, an extended format of the Address Resolution Protocol (ARP) is used as the Ethernet data (Ethernet: registered trademark). The Ethernet data includes an operation, a source MAC address, a source IP address, a destination MAC address, a destination IP address, and a source priority. Here, the IP address is an address for communication targeted by the invention.

When the communication frame is an address search frame, the contents of each code are as follows. The address indicating the broadcast is put in the "destination MAC address", and the MAC address of the source is put in the "source MAC address". The code indicating that it is an address search frame, for example 1, is put in the "operation". The IP address of the source is put in the "destination IP address" and the "source IP address". The priority of the source determined by the user is put in the "source priority". When the priority is not determined by the user's selection, the "source priority" is omitted, and the address resolution protocol (ARP) format used by the network apparatus of the existing technology is used.

When the communication frame is a return frame, each code is as follows. The MAC address of the return destination is put in the "destination MAC address", and the MAC address of the source is put in the "source MAC address". In other words, the return frame is a unicast with a specified destination. The code indicating that it is a return frame, for example 2, is put in the "operation". The IP address of the return destination is put in the "destination IP address", and the IP address of the source that overlaps with the return destination is put in the "source IP address". The priority of the source determined by the user is put in the "source priority". When the priority is not determined by the user's selection, the "source priority" is omitted, and the address resolution protocol (ARP) format used by the network apparatus of the existing technology is used.

(Operation Flow at the Time of Connection)

An operation when the network apparatus 10 according to the present embodiment is newly connected to the communication network 90 will be described hereinafter with reference to the flowchart of FIG. 3.

Step S11: The control unit 11 puts the IP address of the network apparatus 10 in the "destination IP address" through the communication unit 12 and broadcasts the address search frame to the communication network 90. At that time, if the priority is set, the priority of the network apparatus 10 is put in the "source priority" (first address search frame). Here, the broadcast is repeated a predetermined number of times. As a specific example, the number of times can be four. The interval between the broadcasts can be, for example, 0 to 300 mS.

Then, the other apparatus 91 being connected to the communication network 90 analyzes the address search frame, and returns a return frame when the IP address of the other apparatus 91 itself overlaps with the "destination IP address".

Step S12: Subsequently, the control unit 11 determines whether or not a return frame is received from the other apparatus 91 while repeating the broadcast the predetermined number of times. As a specific example, the deadline can be up to 200 mS after the end of the fourth broadcast.

The control unit 11 analyzes the Ethernet data when the "destination MAC address" is the MAC address of the network apparatus 10 in the communication frame in the communication network 90 detected through the communication unit 12 (Ethernet: registered trademark). Then, when the code of the "operation" is a code indicating that it is a return frame and the "source IP address" is the same as the IP address of the network apparatus 10, the control unit 11 determines that the communication frame is a return frame for the broadcast in step S11.

When it is determined that the return frame is received, the process proceeds to step S13 (YES in S12); otherwise, the process proceeds to step S18.

Step S13: The control unit 11 controls the display unit 14 to display that an overlap of the IP addresses occurs. The display method may include display by characters or illustrations on a display, lighting of an LED (Light Emitting Diode), or other appropriate methods. The display is not necessary, and step S13 itself may be omitted.

Step S14: Subsequently, the control unit 11 determines whether or not there is a priority setting for the network apparatus. When it is determined that there is a priority setting (YES in S14), the process proceeds to step S15; otherwise, the process proceeds to step S17.

Step S15: The control unit 11 determines whether or not the return frame does not include the priority. Here, the priority included in the return frame is the priority of the other apparatus 91 of the sender that transmitted the return frame. When it is determined that the priority is not included (YES in S15), the process proceeds to step S18; otherwise (NO in S15), the process proceeds to step S16.

Step S16: The control unit 11 determines whether or not the priority of the network apparatus 10 is higher than the priority of the other apparatus 91 of the sender included in the return frame (second return frame). If it is determined to be high (YES in S16), the process proceeds to step S18; otherwise, the process proceeds to step S17.

Step S17: The control unit 11 controls the communication unit 12 to block the connection to the communication network 90. Then, the flow ends.

Step S18: The control unit 11 controls the communication unit 12 to maintain the connection to the communication network 90. Then, the flow ends.

(Operation Flow During Connection)

Figure 4:
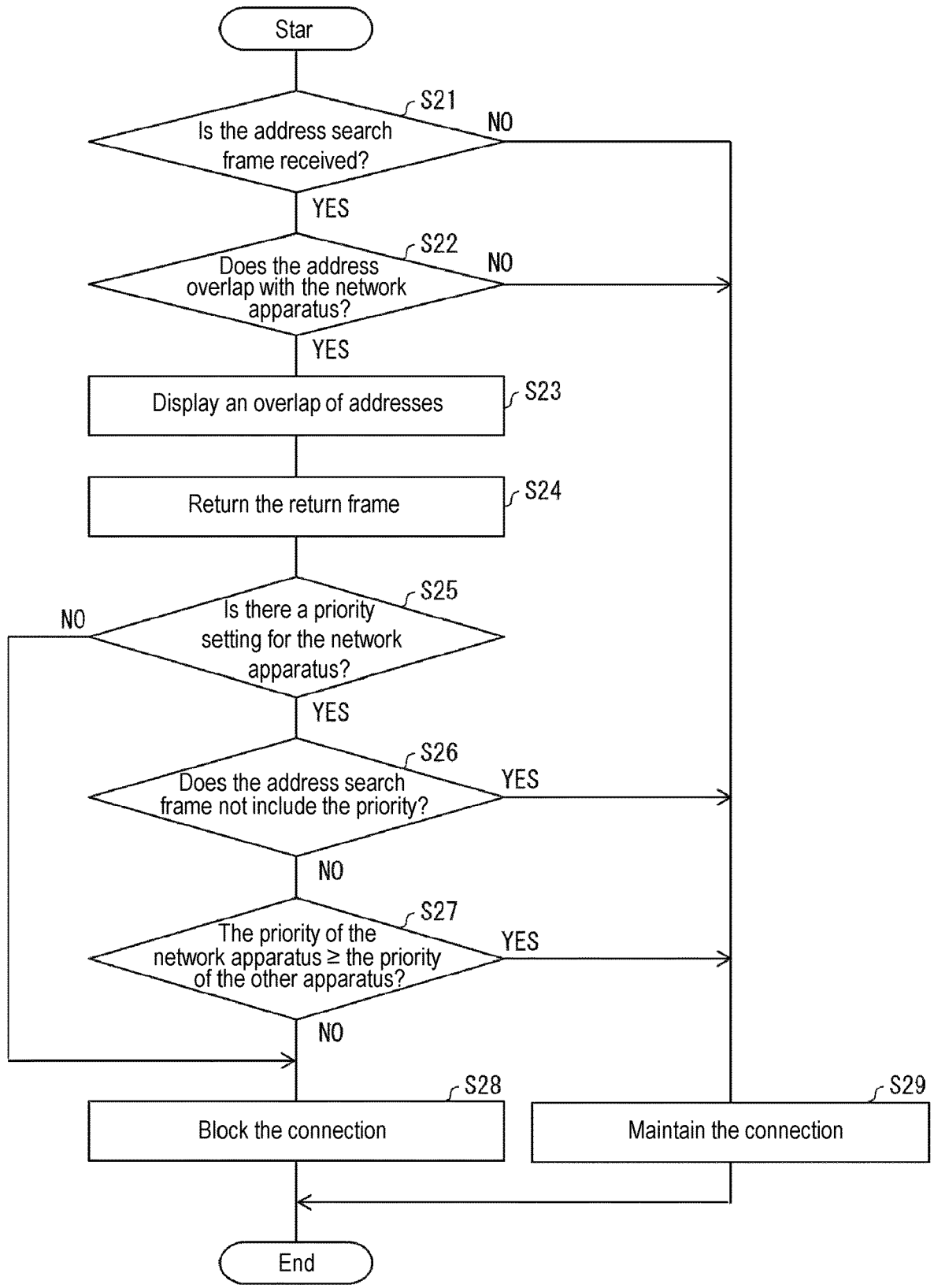
FIG. 4 is a flowchart showing an operation of the network apparatus according to the present embodiment of the invention during connection to the communication network.

An operation during connection of the network apparatus 10 according to the present embodiment to the communication network 90 will be described hereinafter with reference to the flowchart of FIG. 4. The network apparatus 10 periodically executes the following flow during connection to the communication network 90.

Step S21: The control unit 11 monitors whether or not an address search frame broadcast by the other apparatus 91 connected to the communication network 90 is received through the communication unit 12.

The control unit 11 analyzes the Ethernet data when the "destination MAC address" is an address indicating a broadcast in the communication frame in the communication network 90 detected through the communication unit 12 (Ethernet: registered trademark). Then, when the code of the "operation" is a code indicating that it is an address search frame, the control unit 11 determines that the communication frame is an address search frame.

When the address search frame is received (YES in S21), the process proceeds to step S22; otherwise (NO in S21), the process proceeds to step S29.

Step S22: the control unit 11 determines whether or not the "destination IP address" of the received address search frame is the IP address of the network apparatus 10 and the "source IP address" overlaps with the IP address of the network apparatus 10. If it is determined that the IP addresses overlap (YES in S22), the process proceeds to step S23; otherwise (NO in S22), the process proceeds to step S29.

Step S23: The control unit 11 controls the display unit 14 to display that an overlap of the IP addresses occurs. The display method may include display by characters or illustrations on a display, lighting of an LED (Light Emitting Diode), or other appropriate methods. The display is not necessary, and step S23 itself may be omitted.

Step S24: Subsequently, the control unit 11 puts the "source MAC address" of the received address search frame in the "destination MAC address" of the return frame, and transmits a return frame to the other apparatus 91, which is the source of the address search frame, through the communication unit 12. Further, if the priority is set, the priority of the network apparatus 10 is put in the "source priority" (first return frame).

Step S25: Subsequently, the control unit 11 determines whether or not there is a priority setting for the network apparatus. When it is determined that there is a priority setting (YES in S25), the process proceeds to step S26; otherwise, the process proceeds to step S28.

Step S26: The control unit 11 determines whether or not the address search frame does not include the priority. Here, the priority included in the address search frame is the priority of the other apparatus 91 of the sender that broadcasts the address search frame. When it is determined that the priority is not included (YES in S26), the process proceeds to step S29; otherwise (NO in S26), the process proceeds to step S27.

Step S27: The control unit 11 determines whether or not the priority of the network apparatus 10 is equal to or higher than the priority of the other apparatus 91 of the sender included in the address search frame (second address search frame). When it is determined that the priority is equal to or higher than the priority of the other apparatus 91 (YES in S27), the process proceeds to step S29; otherwise, the process proceeds to step S28.

Step S28: The control unit 11 controls the communication unit 12 to block the connection to the communication network 90. Then, the flow ends.

Step S29: The control unit 11 controls the communication unit 12 to maintain the connection to the communication network 90. Then, the flow ends.

3. Operation Example

Embodiments, serving as the operation example of the network apparatus 10 according to the present embodiment, will be described hereinafter with reference to FIG. 5 to FIG. 10.

Figure 9:
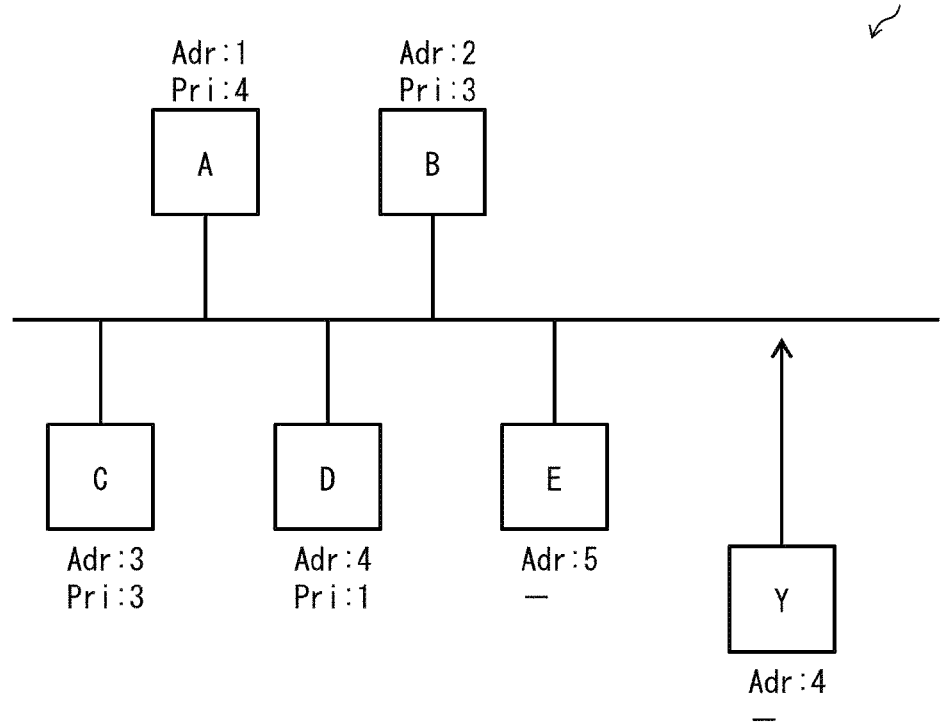
FIG. 9 is a diagram showing an example of the fifth embodiment of the invention. (a) shows a state before a new apparatus tries to connect to the communication network, and (b) shows a state at a time point when an operation of each apparatus executed when the apparatus tries to connect is completed.
Figure 9:
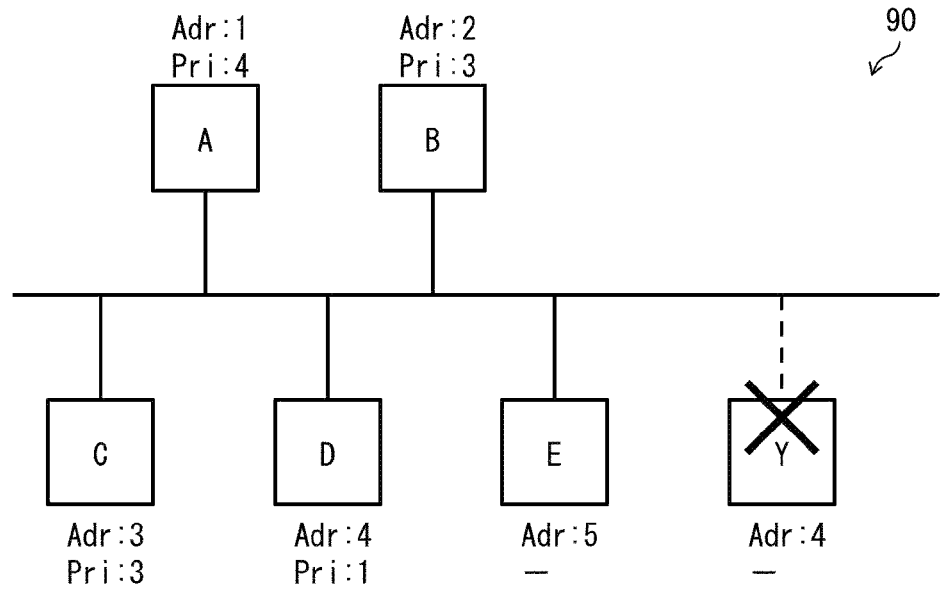
Figure 10:
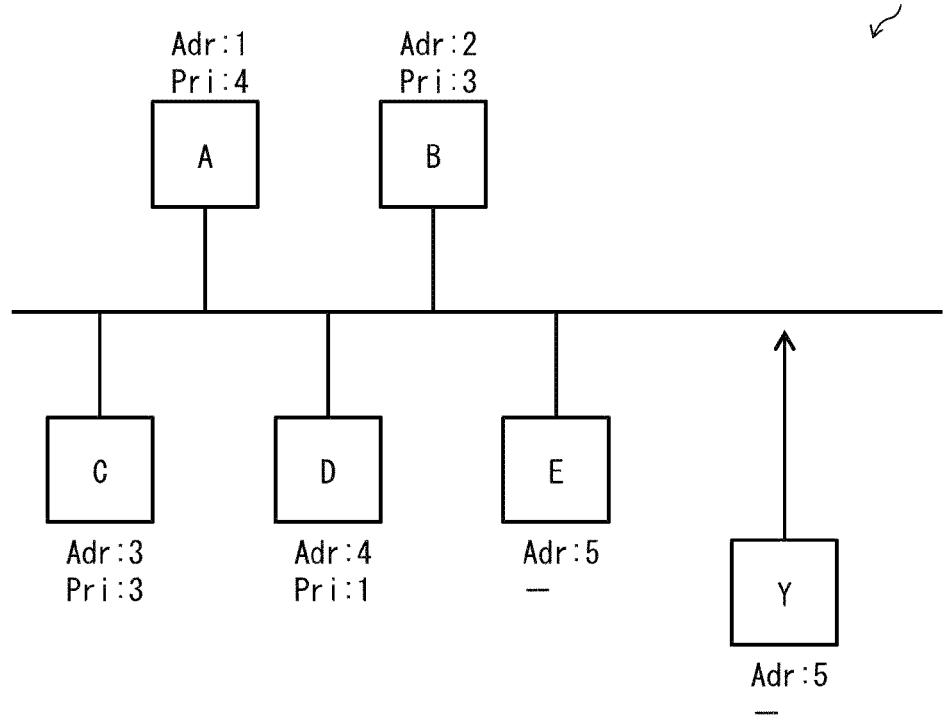
FIG. 10 is a diagram showing an example of the sixth embodiment of the invention. (a) shows a state before a new apparatus tries to connect to the communication network, and (b) shows a state at a time point when an operation of each apparatus executed when the apparatus tries to connect is completed.
Figure 10:
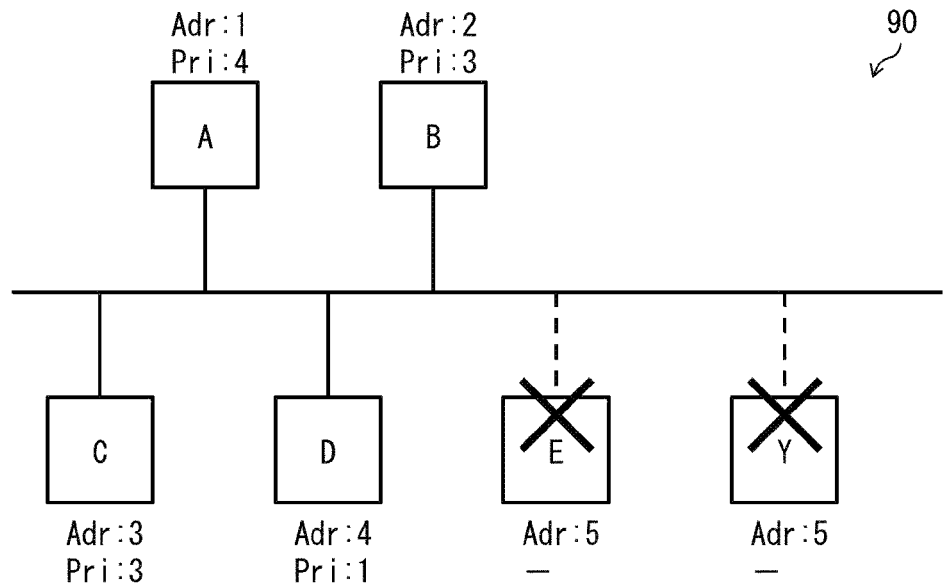

In FIG. 5 to FIG. 8, the network apparatus 10 according to the present embodiment is represented by the symbol X, and the operation when the network apparatus 10 (apparatus X) tries to connect to the communication network 90 is shown. FIG. 9 and FIG. 10 show the operation when a network apparatus Y of the existing technology that does not understand priority tries to connect to the communication network 90.

In each figure, (a) shows a state before the apparatus X or the apparatus Y tries to connect, and (b) shows a state at a time point when the operation of each apparatus executed when the apparatus X or the apparatus Y tries to connect is completed.

First Embodiment

Figure 5:
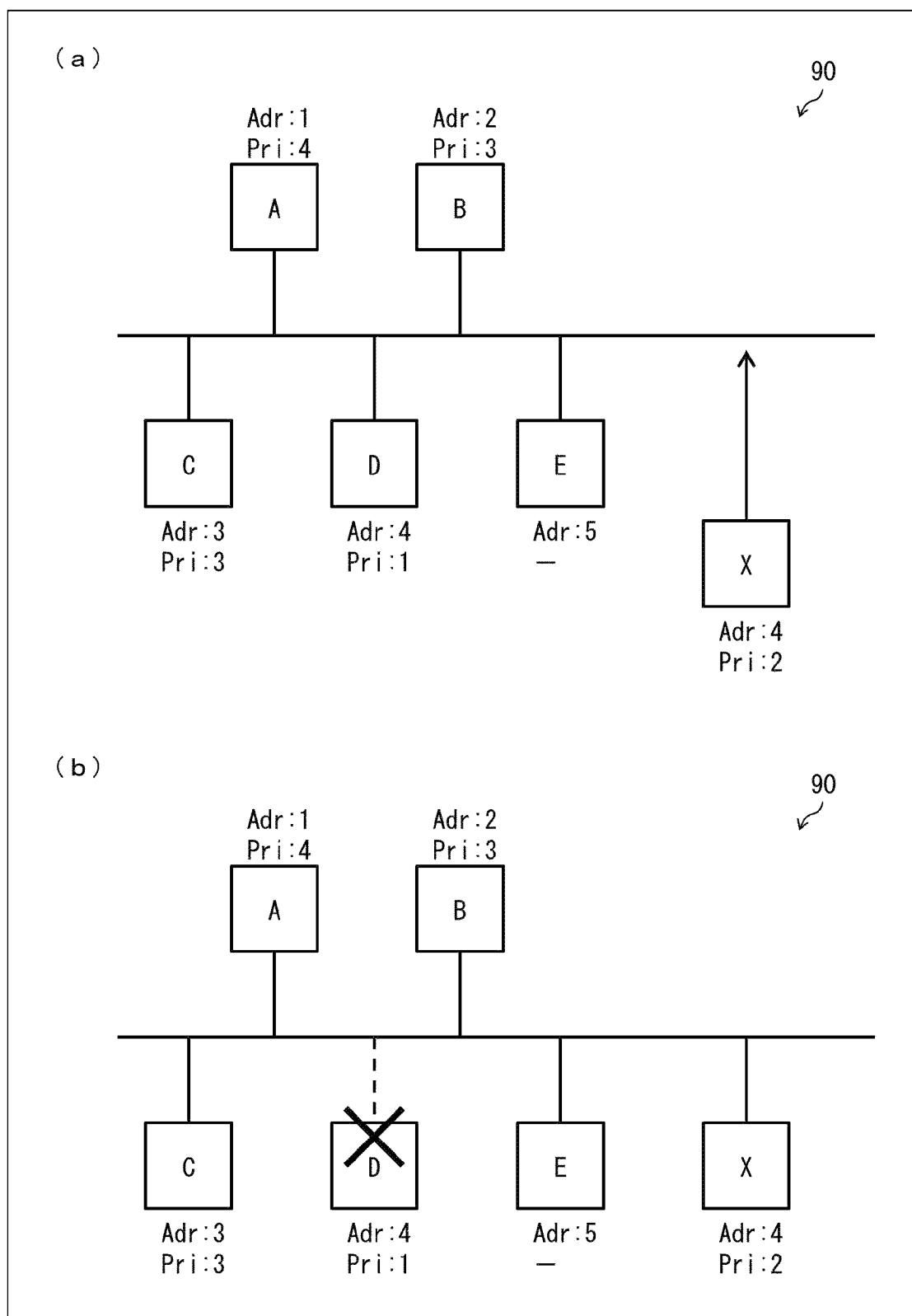
FIG. 5 is a diagram showing an example of the first embodiment of the invention. (a) shows a state before a new apparatus tries to connect to the communication network, and (b) shows a state at a time point when an operation of each apparatus executed when the apparatus tries to connect is completed.

FIG. 5 is a diagram showing an example of the first embodiment. In a state before the apparatus X shown in (a) of FIG. 5 tries to connect, apparatuses A to E are connected and operating in the communication network 90. The apparatuses A to D are network apparatuses according to the invention, and can be set with a priority. The apparatus E is a network apparatus of the existing technology that does not understand the priority.

It is assumed that Adr:1 to Adr:5 are assigned as the IP addresses of the apparatuses A to E, respectively. It is assumed that the priorities of the apparatuses A to D are set to Pri:4, Pri:3, Pri:3, and Pri:1, respectively. Here, the larger the priority number, the higher the priority.

The user sets the IP address Adr:4 and the priority Pri:2 in the apparatus X, and tries to connect to the communication network 90. At the time of connection, the apparatus X broadcasts an address search frame that includes such information to the communication network 90 (step S11).

Then, the apparatus D of the invention that detects an overlap of the IP addresses returns a return frame that includes the priority Pri:1 of the apparatus D to the apparatus X (step S24).

The apparatus X determines that the priority Pri:2 of the apparatus X is higher than the priority Pri:1 of the apparatus D in the return frame (YES in step S16), and establishes the connection to the communication network 90.

On the other hand, the apparatus D of the invention determines that the priority Pri:1 of the apparatus D is lower than the priority Pri:2 of the apparatus X in the address search frame (NO in step S27), and blocks the connection to the communication network 90.

Thus, as shown in (b) of FIG. 5, the apparatus X connects to the communication network 90, and the apparatus D disconnects from the communication network 90.

Second Embodiment

Figure 6:
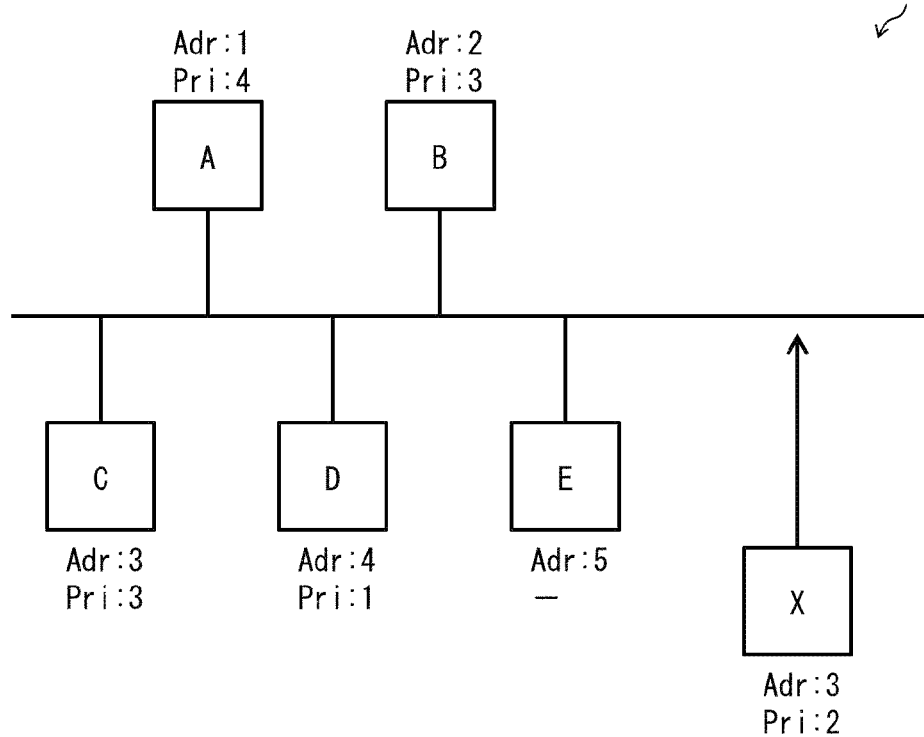
FIG. 6 is a diagram showing an example of the second embodiment of the invention. (a) shows a state before a new apparatus tries to connect to the communication network, and (b) shows a state at a time point when an operation of each apparatus executed when the apparatus tries to connect is completed.
Figure 6:
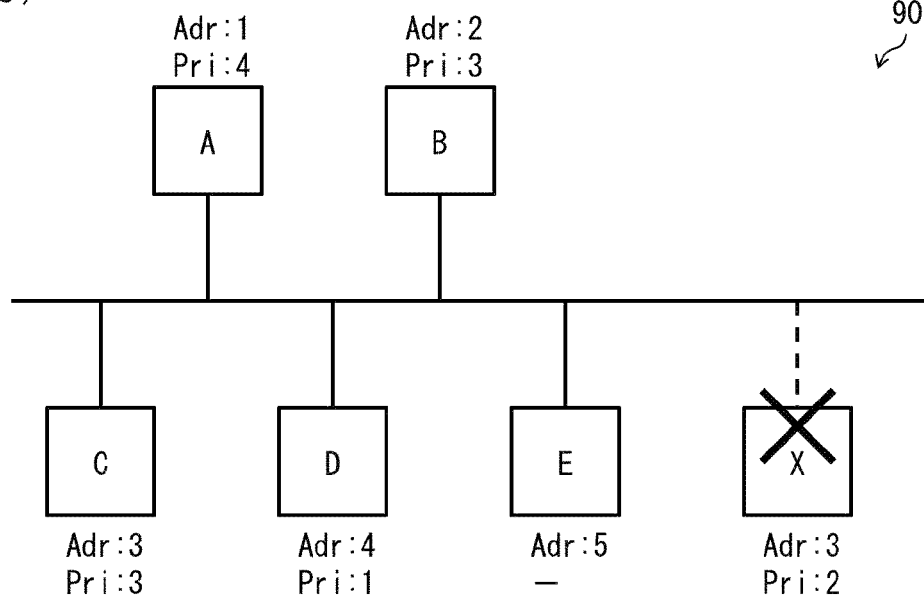

The second embodiment shown in FIG. 6 is different from the case of the first embodiment, and is an example in which the user sets the IP address Adr:3 and the priority Pri:2 in the apparatus X and tries to connect to the communication network 90.

At the time of connection, the apparatus X broadcasts an address search frame that includes the information of the IP address and priority of the apparatus X to the communication network 90 (step S11).

Then, the apparatus C of the invention that detects an overlap of the IP addresses returns a return frame that includes the priority Pri:3 of the apparatus C to the apparatus X (step S24).

The apparatus X determines that the priority Pri:2 of the apparatus X is equal to or lower than the priority Pri:3 of the apparatus C in the return frame (NO in step S16), and blocks the connection to the communication network 90.

On the other hand, the apparatus C of the invention determines that the priority Pri:3 of the apparatus C is equal to or higher than the priority Pri:2 of the apparatus X in the address search frame (YES in step S27), and maintains the connection to the communication network 90.

Thus, as shown in (b) of FIG. 6, the apparatus X cannot establish the connection to the communication network 90, and the apparatus C maintains the connection to the communication network 90.

Third Embodiment

Figure 7:
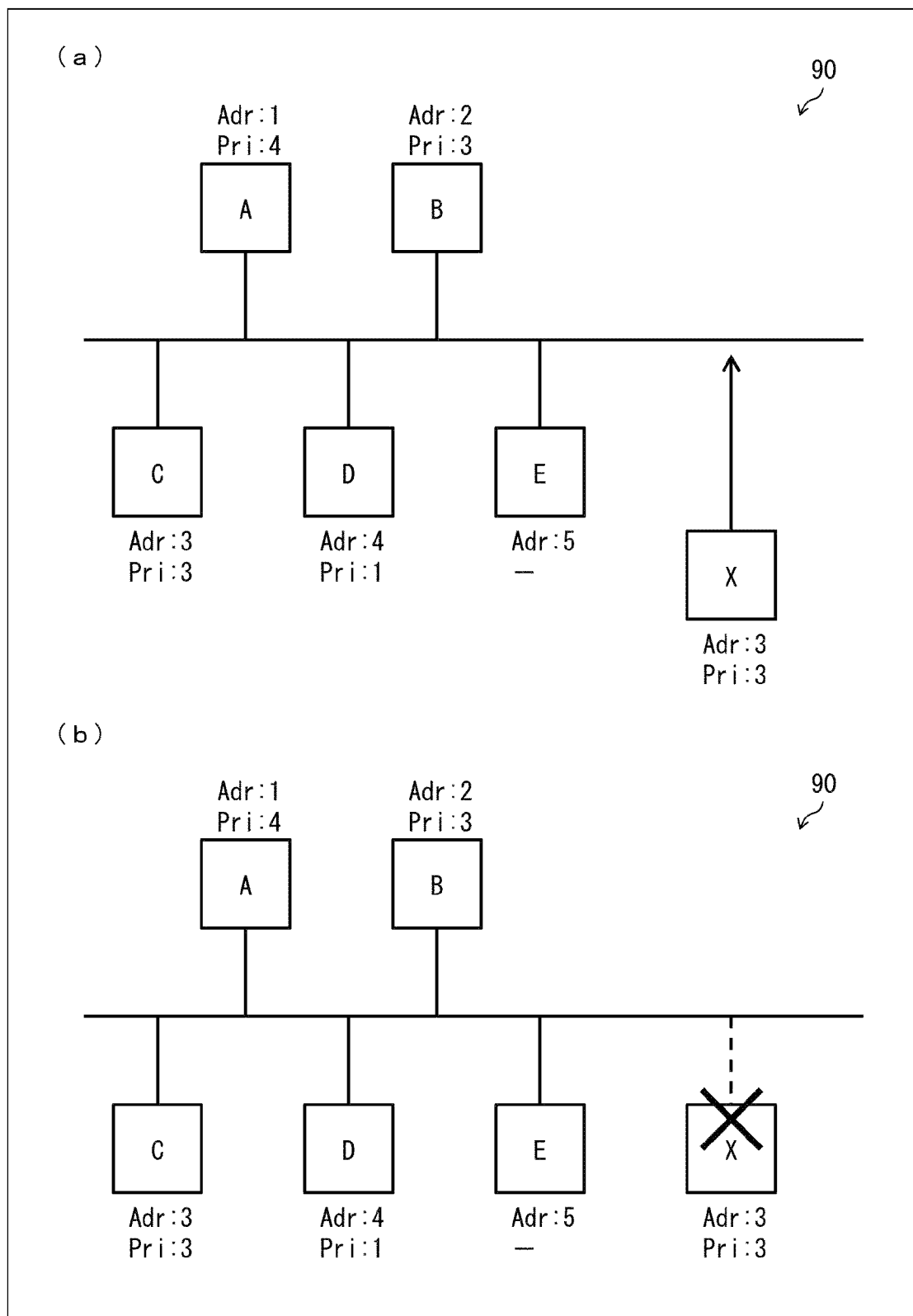
FIG. 7 is a diagram showing an example of the third embodiment of the invention. (a) shows a state before a new apparatus tries to connect to the communication network, and (b) shows a state at a time point when an operation of each apparatus executed when the apparatus tries to connect is completed.

The third embodiment shown in FIG. 7 is different from the case of the first embodiment, and is an example in which the user sets the IP address Adr:3 and the priority Pri:3 in the apparatus X and tries to connect to the communication network 90.

At the time of connection, the apparatus X broadcasts an address search frame that includes the information of the IP address and priority of the apparatus X to the communication network 90 (step S11).

Then, the apparatus C of the invention that detects an overlap of the IP addresses returns a return frame that includes the priority Pri:3 of the apparatus C to the apparatus X (step S24).

The apparatus X determines that the priority Pri:3 of the apparatus X is equal to or lower than the priority Pri:3 of the apparatus C in the return frame (NO in step S16), and blocks the connection to the communication network 90.

On the other hand, the apparatus C of the invention determines that the priority Pri:3 of the apparatus C is equal to or higher than the priority Pri:3 of the apparatus X in the address search frame (YES in step S27), and maintains the connection to the communication network 90.

Thus, as shown in (b) of FIG. 7, the apparatus X cannot establish the connection to the communication network 90, and the apparatus C maintains the connection to the communication network 90.

Fourth Embodiment

Figure 8:
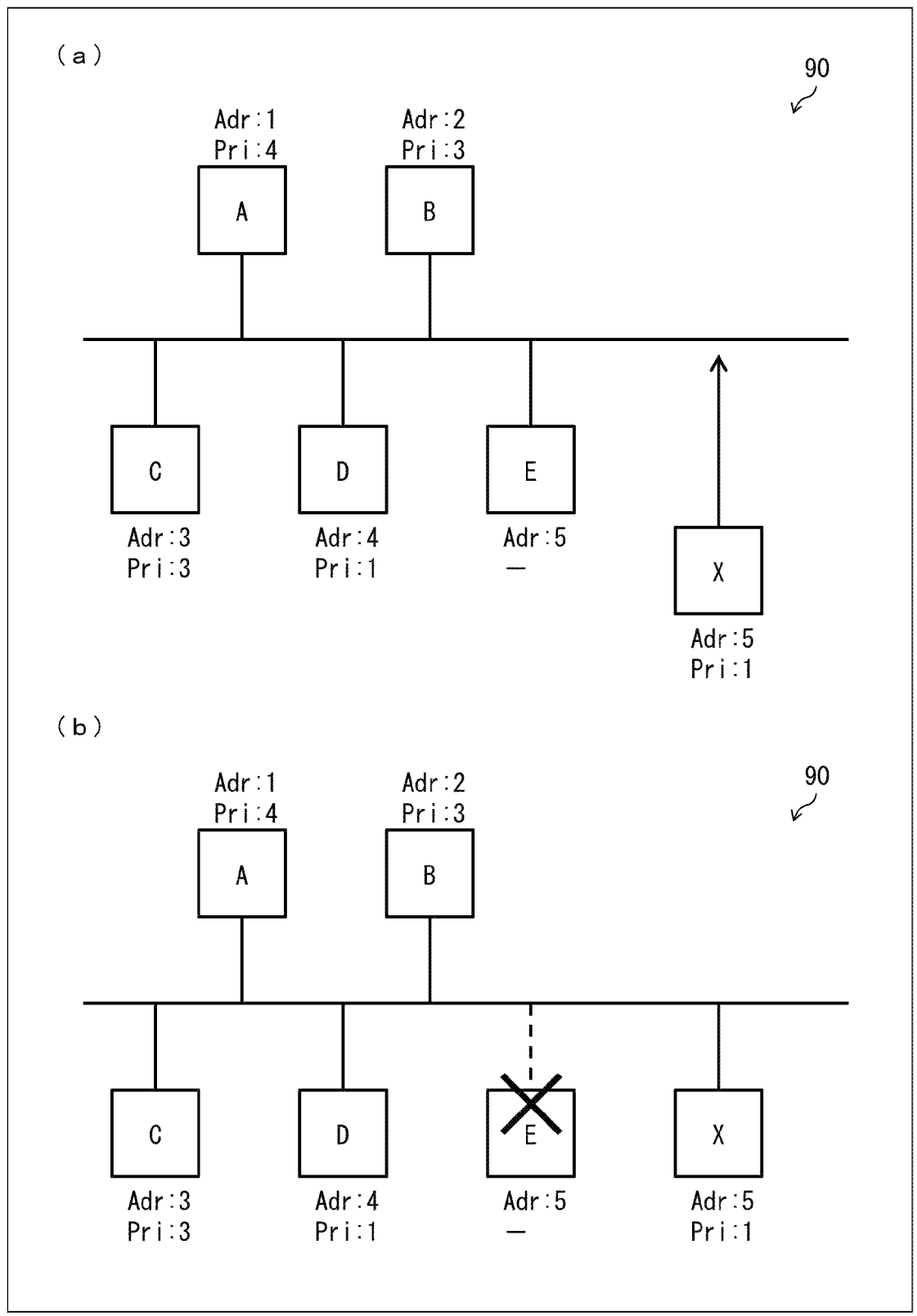
FIG. 8 is a diagram showing an example of the fourth embodiment of the invention. (a) shows a state before a new apparatus tries to connect to the communication network, and (b) shows a state at a time point when an operation of each apparatus executed when the apparatus tries to connect is completed.

The fourth embodiment shown in FIG. 8 is different from the case of the first embodiment, and is an example in which the user sets the IP address Adr:5 and the priority Pri:1 in the apparatus X and tries to connect to the communication network 90.

At the time of connection, the apparatus X broadcasts an address search frame that includes the information of the IP address and priority of the apparatus X to the communication network 90 (step S11).

Then, the apparatus E of the existing technology that does not understand the priority and detects an overlap of the IP addresses returns a return frame (third return frame) that does not include the priority to the apparatus X.

The apparatus X determines that the return frame does not include the priority (YES in step S15), and establishes the connection to the communication network 90.

On the other hand, the apparatus E of the existing technology that detects an overlap of the IP addresses blocks the connection to the communication network 90.

Thus, as shown in (b) of FIG. 8, the apparatus X connects to the communication network 90, and the apparatus E disconnects from the communication network 90.

Fifth Embodiment

The fifth embodiment shown in FIG. 9 is different from the case of the first embodiment, and is an example in which the user sets the IP address Adr:4 in the apparatus Y of the existing technology that does not understand the priority and tries to connect to the communication network 90.

At the time of connection, the apparatus Y broadcasts an address search frame (third address search frame) that includes the information of the IP address of the apparatus Y to the communication network 90.

Then, the apparatus D of the invention that detects an overlap of the IP addresses returns a return frame that includes the priority Pri:1 of the apparatus D to the apparatus Y (step S24).

When receiving the return frame for the above address search frame, the apparatus Y blocks the connection to the communication network 90 as if the IP addresses overlap.

On the other hand, the apparatus D of the invention determines that the address search frame does not include the priority (YES in step S26), and maintains the connection to the communication network 90.

Thus, as shown in (b) of FIG. 9, the apparatus Y cannot establish the connection to the communication network 90, and the apparatus D maintains the connection to the communication network 90.

Sixth Embodiment

The sixth embodiment shown in FIG. 10 is different from the case of the first embodiment, and is an example in which the user sets the IP address Adr:5 in the apparatus Y of the existing technology that does not understand the priority and tries to connect to the communication network 90.

At the time of connection, the apparatus Y broadcasts an address search frame that includes the information of the IP address of the apparatus Y to the communication network 90.

Then, the apparatus E of the existing technology that does not understand the priority and detects an overlap of the IP addresses returns a return frame that does not include the priority to the apparatus Y.

When receiving the return frame for the above address search frame, the apparatus Y blocks the connection to the communication network 90 as if the IP addresses overlap.

On the other hand, the apparatus E of the existing technology also blocks the connection to the communication network 90 as if the IP addresses overlap.

Thus, when there is an overlap of the IP addresses between apparatuses of the existing technology, as shown in (b) of FIG. 10, the apparatus Y cannot establish the connection to the communication network 90, and the apparatus E disconnects from the communication network 90.

Additional Note

In the above first to sixth embodiments, the apparatus E or the apparatus Y is assumed to be an apparatus of the existing technology that does not understand the priority. However, even if they are the network apparatus 10 according to the present embodiment and the priority is not set by the user, the apparatus E or the apparatus Y still operates in the same manner as in the first to sixth embodiments described above.

4. Function and Effect

As described above, in the case where the network apparatus 10 according to the present embodiment has an address overlapping with the address of the other operating apparatus 91 when connecting to the communication network 90, if the priority of the network apparatus 10 is higher than the priority of the other apparatus 91, the network apparatus 10 can establish the connection to the communication network 90, and if the priority is not higher, the network apparatus 10 cannot connect. Further, when the network apparatus 10 according to the present embodiment has an address overlapping with the address of the other apparatus 91 newly connected to the communication network 90 during connection to the communication network 90, if the priority of the network apparatus 10 is equal to or higher than the priority of the other apparatus 91, the network apparatus 10 can maintain the connection to the communication network 90, and if the priority is lower, the network apparatus 10 disconnects from the communication network 90.

Therefore, the user can set the priority according to the importance of the network apparatus 10 to prevent a more important apparatus from disconnecting from the communication network 90 when there is an overlap of addresses. For a particularly important apparatus, like the apparatus A in the examples of FIG. 5 to FIG. 10, by setting the highest priority, the particularly important apparatus can be prevented from disconnection due to an overlap of addresses with the other apparatus.

Further, as compared with the existing technology in which both apparatuses disconnect from the communication network when there is an overlap of addresses, the disconnection of the apparatuses from the communication network 90 can be minimized.

When there is an overlap of addresses with the apparatus of the existing technology, the apparatus of the existing technology disconnects from the communication network 90, but the network apparatus 10 according to the present embodiment maintains the connection. Therefore, in this case, the disconnection of the apparatuses from the communication network 90 can still be minimized.

In addition, upon receiving the address search frame from the other apparatus 91 of the invention, the network apparatus 10 according to the present embodiment returns the return frame that includes the priority of the network apparatus 10 to the other apparatus 91 when there is an overlap of addresses. The network apparatus 10 compares the priorities and determines whether or not it can be connected to the communication network 90, and the same applies to the other apparatus 91. In this way, both apparatuses are configured to compare the priorities and determine whether to connect.

On the other hand, it is also conceivable to configure for the apparatus on the side that receives the communication frame including the information of the priority to determine which is the priority and return the result to the other apparatus that broadcasts such a communication frame. However, if the other apparatus is an apparatus of the existing technology, it cannot understand the content of such a reply. In other words, for such a configuration, a mixture with the apparatus of the existing technology is not possible. The configuration of the invention not only is applicable between the network apparatuses 10 of the invention but also allows the network apparatus 10 and the existing apparatus to coexist in the communication network 90, which is highly convenient for the user.

Figure 3:
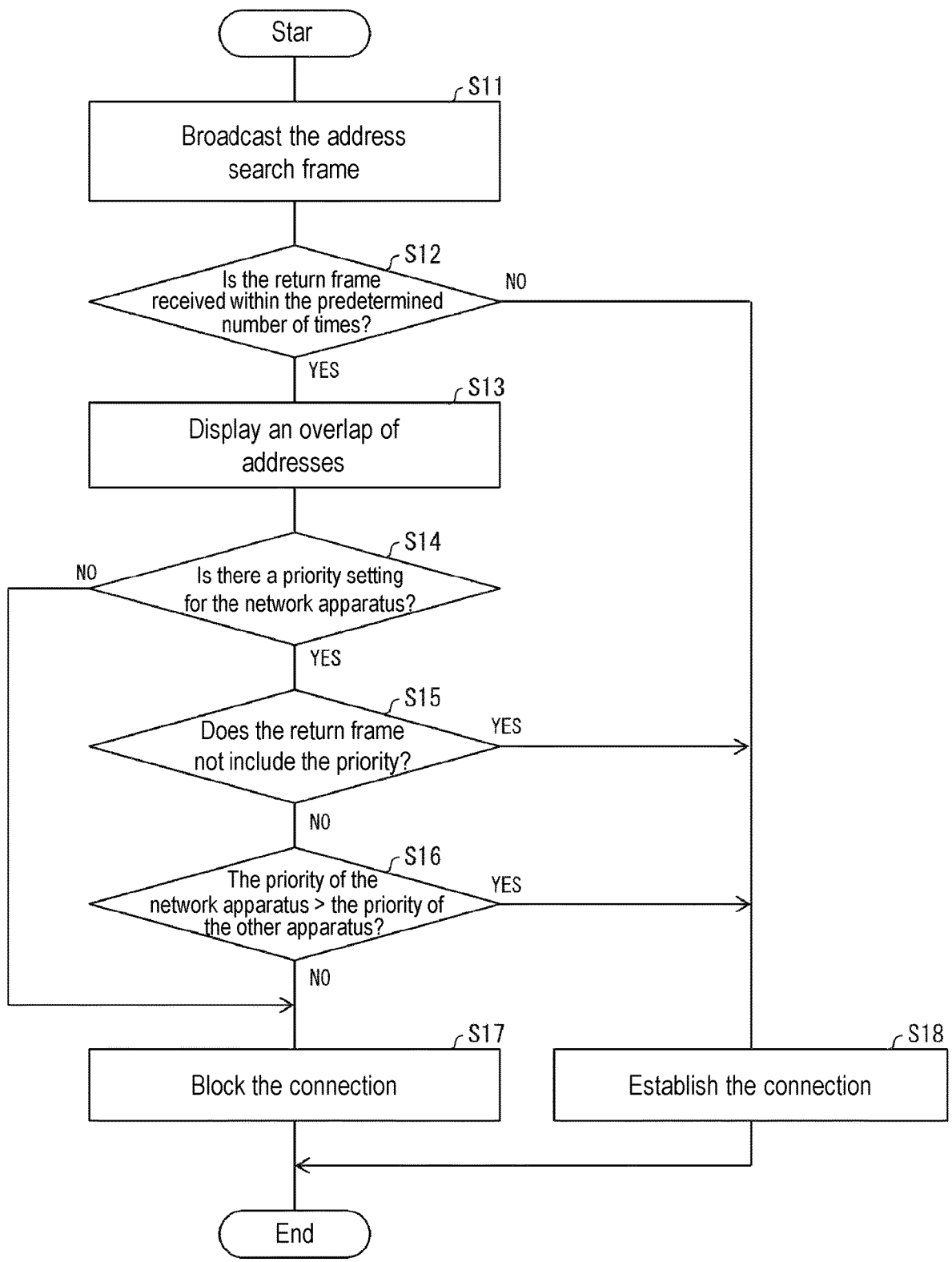
FIG. 3 is a flowchart showing an operation of the network apparatus according to the present embodiment of the invention when connecting to the communication network.

In the present embodiment, the network apparatus 10 executes the operation shown in the flowchart of FIG. 3 when connecting to the communication network 90. However, in order to confirm whether an overlap of addresses occurs, the same operation may be performed intermittently during connection to the communication network 90.

[Example Realized by Software]

The functional blocks (particularly, the control unit 11, the communication unit 12, and the recording unit 13) of the network apparatus 10 may be realized by a logic circuit (hardware) formed in an integrated circuit (IC chip) or the like, or may be realized by software.

In the latter case, the network apparatus 10 includes a computer that executes instructions of a program which is software that realizes each function. The computer includes, for example, one or more processors and a computer-readable recording medium that stores the program. Then, in the computer, the processor reads the program from the recording medium and executes the program, thereby achieving the invention.

For example, a CPU (Central Processing Unit) can be used as the processor. In addition to a "non-temporary tangible medium" such as a ROM (Read Only Memory), a tape, a disk, a card, a semiconductor memory, a programmable logic circuit or the like can be used as the recording medium.

Further, a RAM (Random Access Memory) for developing the above program may be further provided.

In addition, the program may be supplied to the computer via any transmission medium (communication network, broadcast wave, etc.) capable of transmitting the program.

One aspect of the invention can also be realized in the form of a data signal embedded in a carrier wave, in which the above program is embodied by electronic transmission.

Summary

A network apparatus according to one aspect of the invention includes: a communication unit that performs transmission and reception of data with an other apparatus connected to a communication network; and a control unit that controls the communication unit. When the network apparatus connects to the communication network, the control unit broadcasts a first address search frame including an address of the network apparatus and a priority of the network apparatus to the communication network through the communication unit, and upon receiving a second address search frame including an address of the other apparatus and a priority of the other apparatus broadcast by the other apparatus through the communication unit during connection of the network apparatus to the communication network, the control unit compares the address of the network apparatus and the address of the other apparatus, and returns a first return frame including the priority of the network apparatus to the other apparatus through the communication unit when the address of the network apparatus and the address of the other apparatus are the same.

According to the above configuration, it is possible to realize a network apparatus incorporating a mechanism that can protect the connection of the network apparatus that is important to the user to the communication network, or can preferentially connect to the communication network for an important network apparatus.

In the network apparatus according to the one aspect, when the priority of the network apparatus is equal to or higher than the priority of the other apparatus included in the second address search frame broadcast by the other apparatus, the control unit may control the communication unit to maintain connection to the communication network, and when the priority of the network apparatus is lower than the priority of the other apparatus, the control unit may control the communication unit to block connection to the communication network.

According to the above configuration, if there is an overlap of addresses when the other apparatus broadcasts an address search frame, it is possible to specifically decide the priority determination.

In the network apparatus according to the one aspect, upon receiving a second return frame including the priority of the other apparatus as a reply to the first address search frame from the other apparatus through the communication unit, the control unit may control the communication unit to establish connection to the communication network when the priority of the network apparatus is higher than the priority of the other apparatus included in the second return frame, and the control unit may control the communication unit to block connection to the communication network when the priority of the network apparatus is equal to or lower than the priority of the other apparatus.

According to the above configuration, if there is an overlap of addresses with the other apparatus when the network apparatus broadcasts an address search frame, it is possible to specifically decide the priority determination.

In the network apparatus according to the one aspect, upon receiving a third address search frame that includes the address of the other apparatus broadcast by the other apparatus and does not include the priority through the communication unit during connection of the network apparatus to the communication network, the control unit may control the communication unit to maintain connection to the communication network.

According to the above configuration, if there is an overlap of addresses when the other apparatus not set with a priority broadcasts an address search frame, it is possible to specifically decide the priority determination.

In the network apparatus according to the one aspect, upon receiving a third return frame that does not include the priority of the other apparatus as a reply to the first address search frame from the other apparatus through the communication unit, the control unit may control the communication unit to establish connection to the communication network.

According to the above configuration, if there is an overlap of addresses with the other apparatus not set with a priority when the network apparatus broadcasts an address search frame, it is possible to specifically decide the priority determination.

In the network apparatus according to the one aspect, even during connection of the network apparatus to the communication network, the control unit may broadcast the first address search frame intermittently to the communication network through the communication unit.

According to the above configuration, it is possible to periodically check whether there is an overlap of addresses during connection to the communication network.

The invention is not limited to the above-described application example, configuration example, and embodiments, and various modifications can be made within the scope of the claims. Embodiments obtained by appropriately combining the disclosed technical means are also included in the technical scope of the invention.

What is claimed is:

1. A network apparatus in a field of factory automation for connecting to a communication network, comprising:
    a memory storing a plurality of computer instructions;
    a processor; and
    a communication unit being a circuit that performs transmission and reception of data with an other apparatus connected to the communication network, wherein a control unit that controls the communication unit is implemented by the processor and the memory storing the computer instructions,
    wherein when the network apparatus connects to the communication network, the control unit broadcasts a first address search frame including an address of the network apparatus and a priority, if the priority is set, of the network apparatus to the communication network through the communication unit, wherein the priority of the network apparatus is set based on received user input, upon receiving a second address search frame including an address of the other apparatus and a priority of the other apparatus broadcast by the other apparatus through the communication unit during connection of the network apparatus to the communication network, the control unit compares the address of the network apparatus and the address of the other apparatus, and returns a first return frame including the priority of the network apparatus to the other apparatus through the communication unit when the address of the network apparatus and the address of the other apparatus are the same,
    upon receiving a second return frame as a reply to the first address search frame from the other apparatus through the communication unit, the control unit determines if the priority of the network apparatus is set,
    if the priority of the network apparatus is not set, the control unit controls the communication unit to block connection to the communication network,
    if the priority of the network apparatus is set, the control unit determines if the second return frame includes a priority of the other apparatus,
    if the second return frame does not include the priority of the other apparatus, the control unit maintains the connection to the communication network,
    if the second return frame includes the priority of the other apparatus, the control unit compares the priority of the network apparatus with the priority of the other apparatus.

2. The network apparatus according to claim 1, wherein when the priority of the network apparatus is equal to or higher than the priority of the other apparatus included in the second address search frame broadcast by the other apparatus, the control unit controls the communication unit to maintain connection to the communication network, and when the priority of the network apparatus is lower than the priority of the other apparatus, the control unit controls the communication unit to block connection to the communication network.

3. The network apparatus according to claim 2,
    the control unit controls the communication unit to establish connection to the communication network when the priority of the network apparatus is higher than the priority of the other apparatus included in the second return frame, and the control unit controls the communication unit to block connection to the communication network when the priority of the network apparatus is equal to or lower than the priority of the other apparatus.

4. The network apparatus according to claim 2, wherein upon receiving a third address search frame that includes the address of the other apparatus broadcast by the other apparatus and does not include the priority through the communication unit during connection of the network apparatus to the communication network, the control unit controls the communication unit to maintain connection to the communication network.

5. The network apparatus according to claim 2, wherein even during connection of the network apparatus to the communication network, the control unit broadcasts the first address search frame intermittently to the communication network through the communication unit.

6. The network apparatus according to claim 1,
the control unit controls the communication unit to establish connection to the communication network when the priority of the network apparatus is higher than the priority of the other apparatus included in the second return frame, and the control unit controls the communication unit to block connection to the communication network when the priority of the network apparatus is equal to or lower than the priority of the other apparatus.

7. The network apparatus according to claim 6, wherein upon receiving a third address search frame that includes the address of the other apparatus broadcast by the other apparatus and does not include the priority through the communication unit during connection of the network apparatus to the communication network, the control unit controls the communication unit to maintain connection to the communication network.

8. The network apparatus according to claim 6, wherein even during connection of the network apparatus to the communication network, the control unit broadcasts the first address search frame intermittently to the communication network through the communication unit.

9. The network apparatus according to claim 1, wherein upon receiving a third address search frame that includes the address of the other apparatus broadcast by the other apparatus and does not include the priority through the communication unit during connection of the network apparatus to the communication network, the control unit controls the communication unit to maintain connection to the communication network.

10. The network apparatus according to claim 9, wherein even during connection of the network apparatus to the communication network, the control unit broadcasts the first address search frame intermittently to the communication network through the communication unit.

11. The network apparatus according to claim 1, wherein even during connection of the network apparatus to the communication network, the control unit broadcasts the first address search frame intermittently to the communication network through the communication unit.

* * * * *